Dec. 10, 1968     H. V. PAPAYOTI     3,415,554
STRUCTURAL JOINT ASSEMBLY AND CONNECTORS THEREFOR
Filed Oct. 17, 1966     4 Sheets-Sheet 3
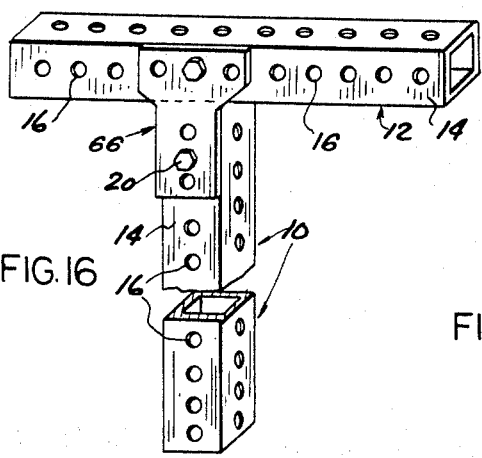
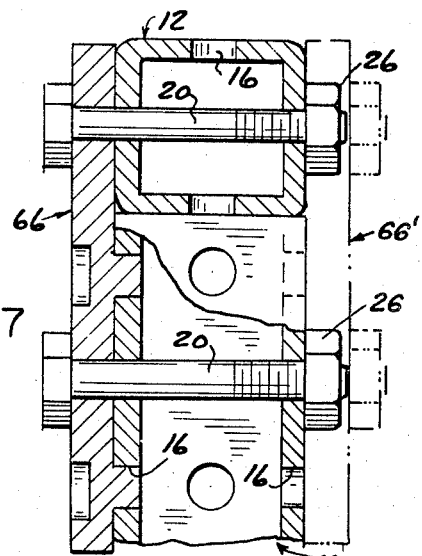
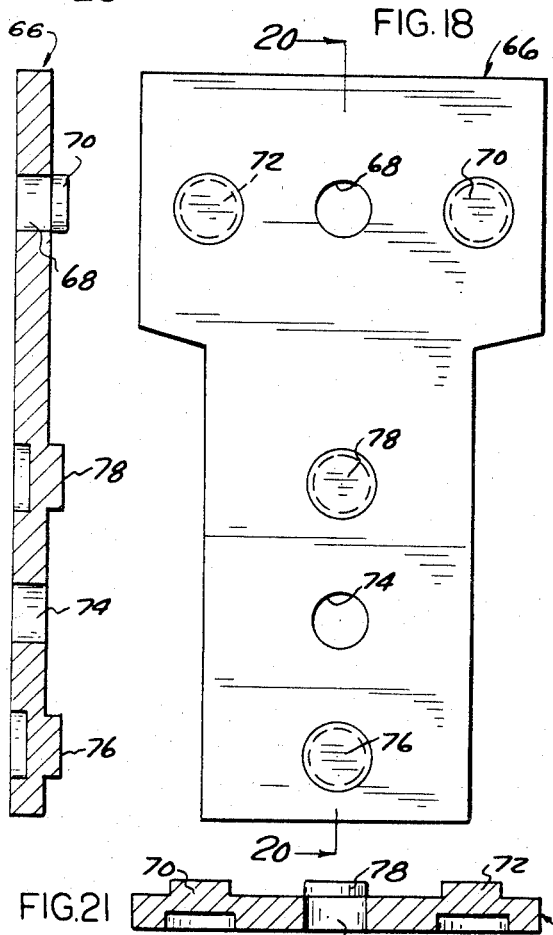
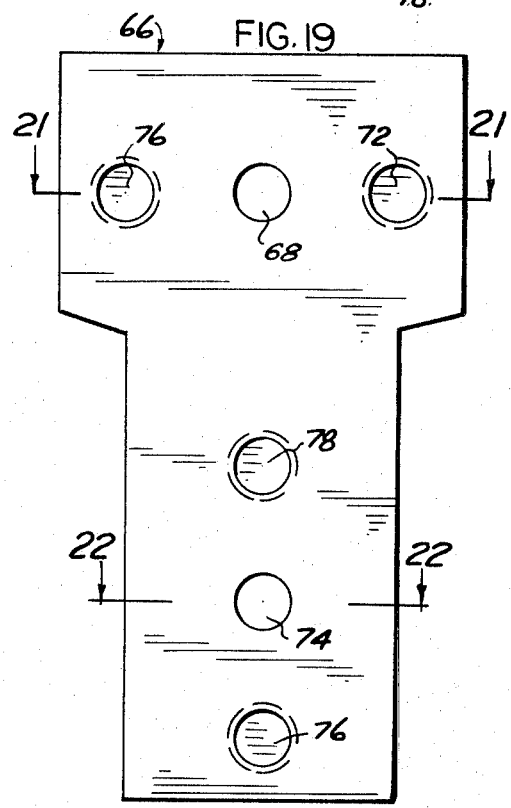
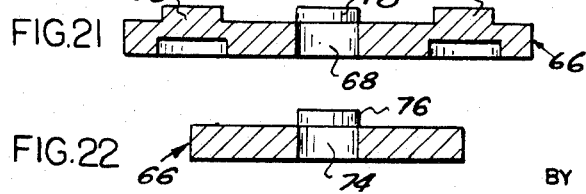
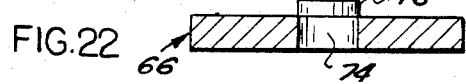
INVENTOR
HRISTO V. PAPAYOTI
BY Hauke, Kraus & Gifford
ATTORNEYS

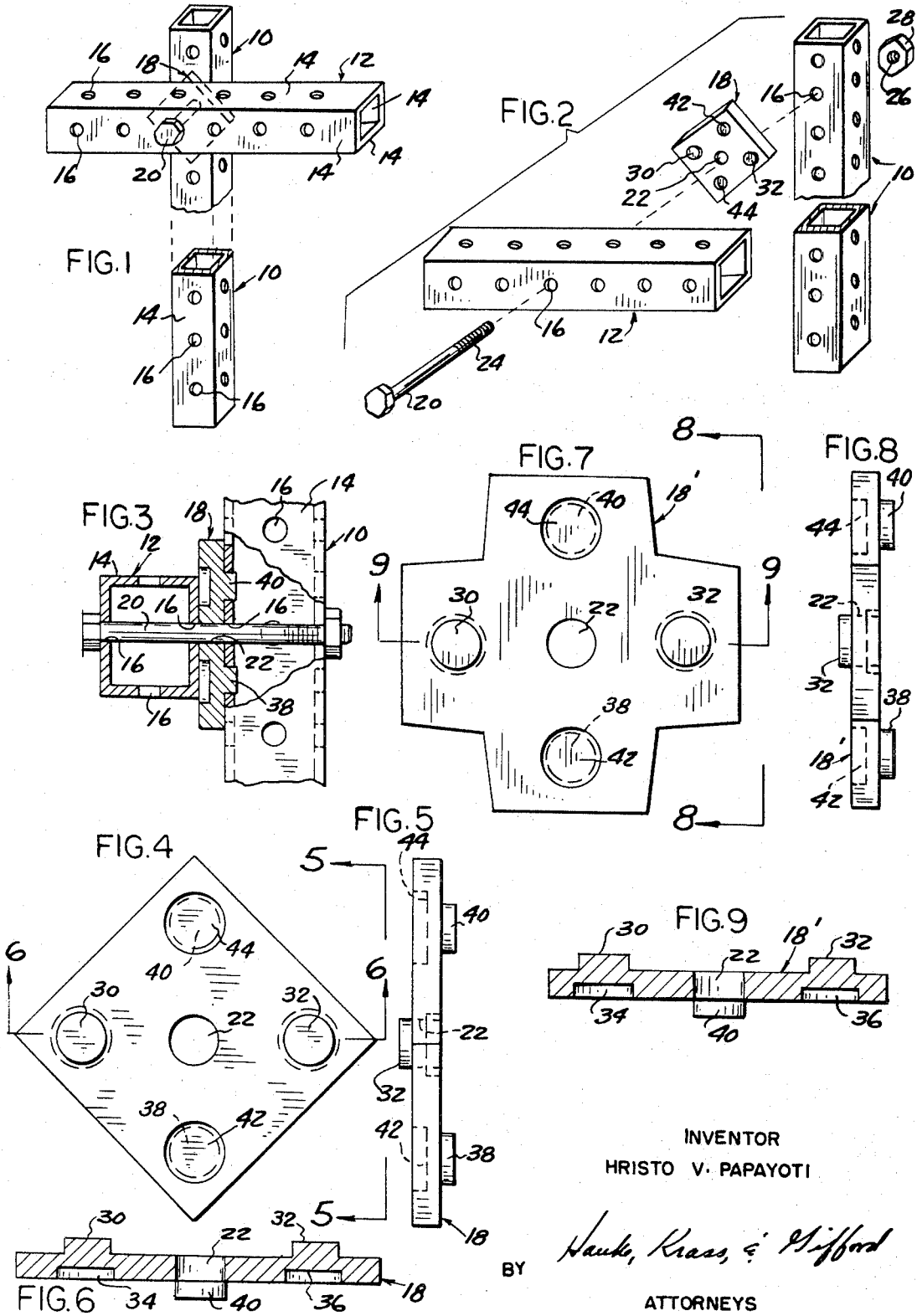

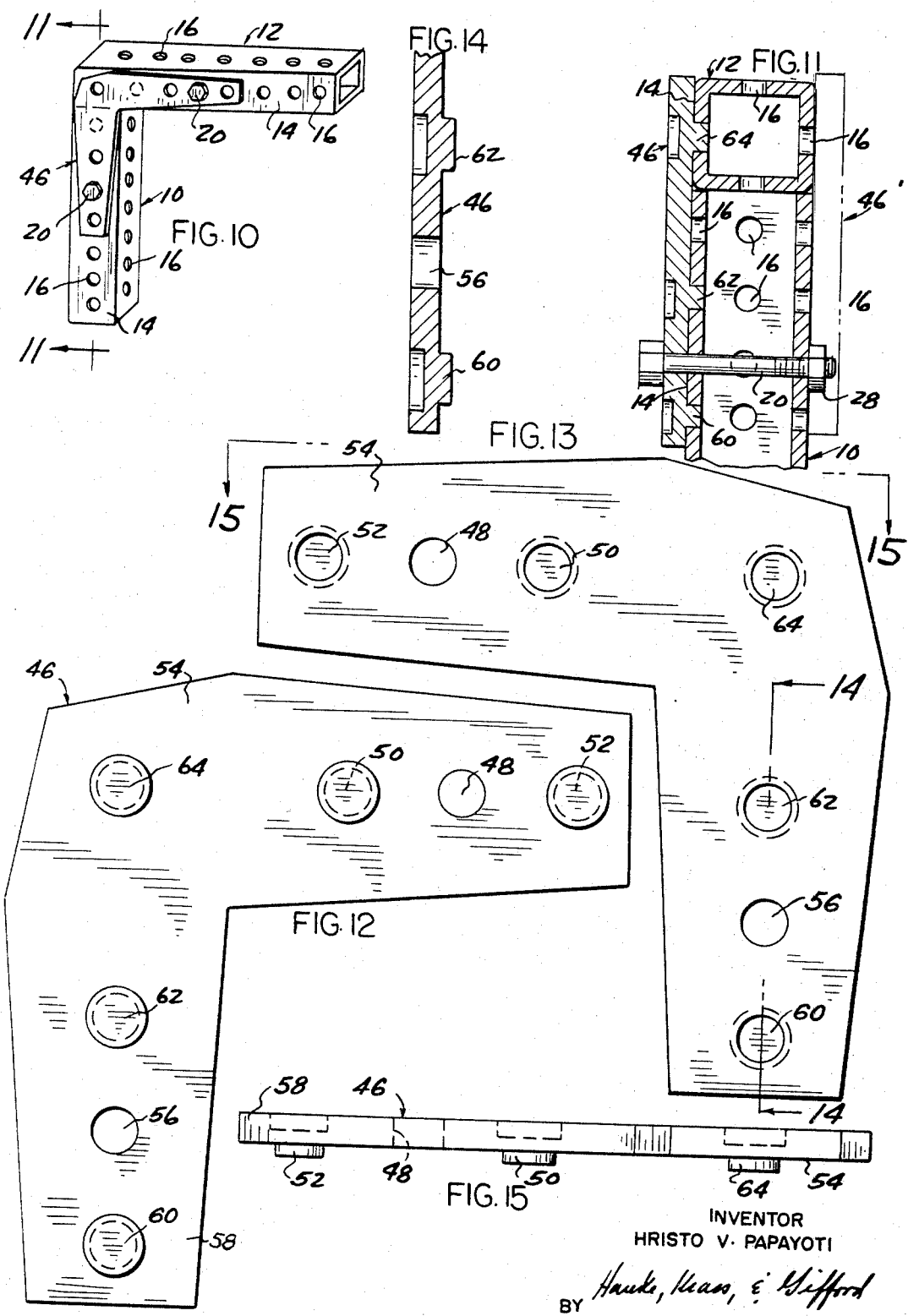

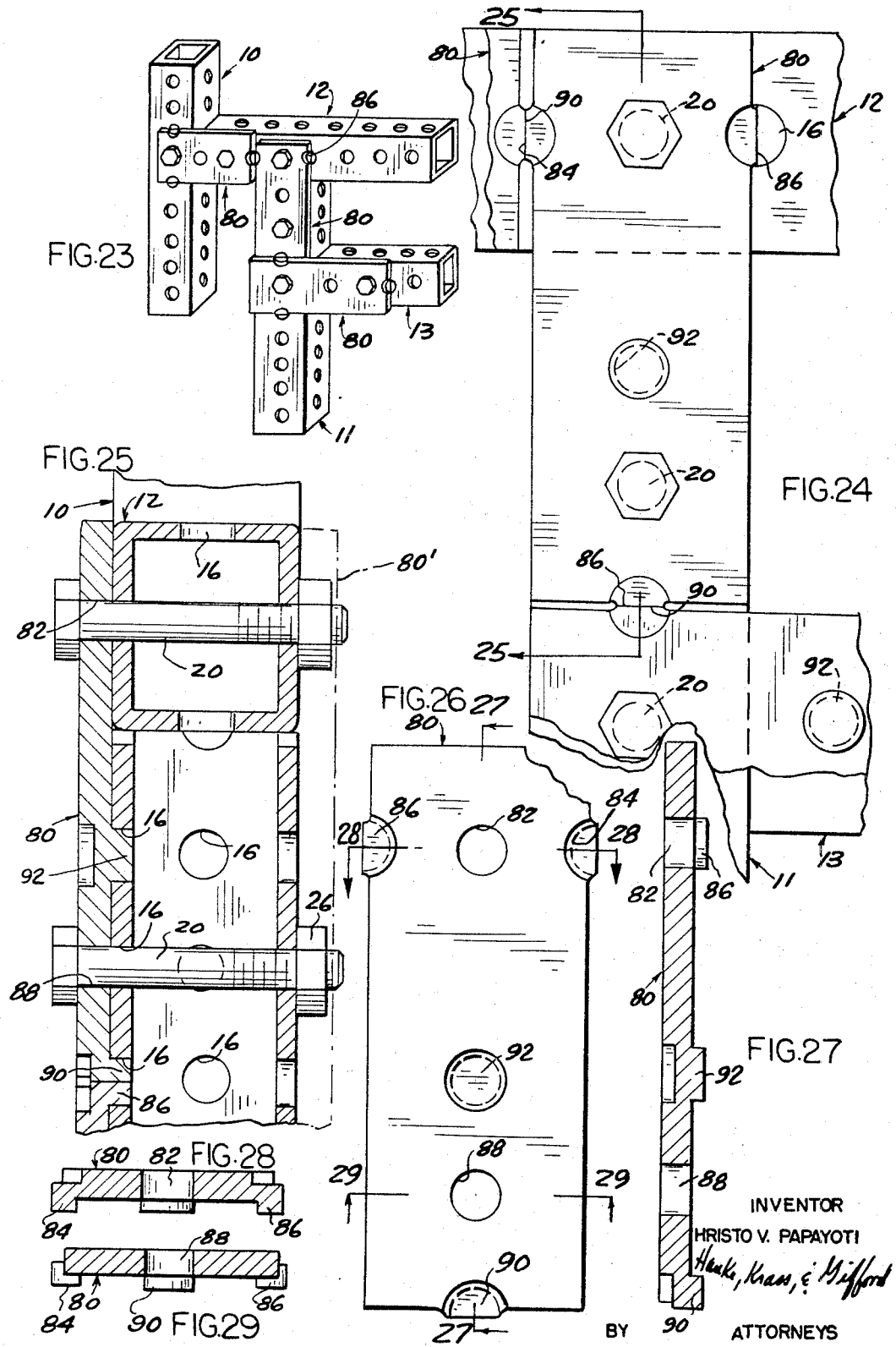

United States Patent Office 3,415,554
Patented Dec. 10, 1968

3,415,554
STRUCTURAL JOINT ASSEMBLY AND
CONNECTORS THEREFOR
Hristo V. Papayoti, Ann Arbor, Mich., assignor to Unistrut Corporation, Wayne, Mich., a corporation of Michigan
Filed Oct. 17, 1966, Ser. No. 588,278
16 Claims. (Cl. 287—189.36)

ABSTRACT OF THE DISCLOSURE

A structural joint assembly including two structural members joined together in a right angle relationship by means of a connector plate engaging each of the structural members and received thereto by a bolt and nut. The connector plate takes a number of forms but in each the plate is provided with at least a pair of perforations engaging in spaced openings in each of the structural members and at least one perforation for receiving the bolt and nut.

---

The present invention relates to structural connectors in general and more particularly to connectors adapted for use in combination with structural members provided with regularly spaced perforations.

Structural connectors according to the present invention provide means for connecting and clamping together two or more structural members, particularly structural members provided with regularly disposed holes, apertures or perforations adapted to be engaged by assembly fasteners such as bolts and nuts. More particularly, structural connectors according to the invention are particularly useful in the assembly of polygonal perforated structural members such as the polygonal tubings well known to persons skilled in the art and sold under the trademarks "Telespar" and "Unistrut."

Such polygonal tubings are generally provided with rows of regularly spaced perforations logitudinally disposed along each sidewall, such perforations being of any shape whatsoever but preferably being circular or rectangular. Although the present invention is disclosed and described with respect to particular applications as connecting means between structural square tubular members having circular perforations, it will be apparent to those skilled in the art that the connectors of the invention may be used without modification for connecting flat or rectangular or rectangularly tubular structural members, channel shaped structural members, and the like, as long as such members are provided with regularly spaced axially disposed rows of perforations. The connectors of the invention are adapted to provide connection between structural members by using a limited number of fasteners, such as ordinary bolts and nuts, while providing strong and rigid assembly between the structural members and substantial load carrying capacity without any risk of the connection becoming loose or angularly variable with the passage of time.

The present invention provides a connector plate member having lug elements for engaging in the perforations of a pair of structural members disposed in a right angle relationship and means for fastening the members in that position to provide a secure structural assembly.

The principal object of the invention, consequently, is to provide structural connectors for structural members having rows of regularly spaced perforations.

Another object of the present invention is to provide structural connectors for said structural members permitting secure assembly and clamping of several such structural members together by way of ordinary simple fasteners such as nuts and bolts, resulting in considerable economy in the number of such fasteners used.

A further object of the invention is to provide structural connectors having aligning means cooperating with regularly disposed perforations in the assembled structural members so as to insure perfect and lasting assemblies without any measuring and without taking any special precaution with respect to the correctness or squareness of the assemblies.

A further object of the present invention is to provide structural connectors which may be used with flat structural members as well as polygonal tubular structural members.

Yet another object of the present invention is to provide structural connectors made of a flat plate member having no angularly bent portion, which would otherwise complicate manufacturing and increase fatigue stress of the connector member.

Those and other objects and advantages of the present invention will become apparent when a description of a few examples of practical embodiments of structural connectors according to the principles thereof is read in conjunction with the accompanying drawings wherein:

FIG. 1. is a perspective schematic view of a structural assembly of two structural members connected together by way of a connector according to the present invention;

FIG. 2 is an exploded view of the assembly of FIG. 1;

FIG. 3 is an elevational view of the structural assembly of FIG. 1, with portions broken away to show the internal construction;

FIG. 4 is a plan view of a connector according to the present invention;

FIG. 5 is an elevational view thereof as seen from line 5—5 of FIG. 4;

FIG. 6 is a cross-sectional view thereof from line 6—6 of FIG. 4;

FIG. 7 is a modification of the structural connector of FIG. 4 as seen in plan view;

FIG. 8 is an end elevational view thereof as seen from line 8—8 of FIG. 7;

FIG. 9 is a cross-sectional view thereof from line 9—9 of FIG. 7;

FIG. 10 is a perspective schematic view of another example of structural assembly using a connector according to a modification of a connector according to the present invention;

FIG. 11 is a cross-sectional view of the structural assembly of FIG. 10 as along plane shown at 11—11 in FIG. 10;

FIG. 12 is a front plan view of the connector of FIGS. 10 and 11;

FIG. 13 is a bottom plan view of the connector of FIG. 12;

FIG. 14 is a cross-sectional view along line 14—14 of FIG. 13;

FIG. 15 is an elevational view as seen from line 15—15 of FIG. 12;

FIG. 16 is a perspective schematic view of another example of a structural assembly using another embodiment of a connector according to the present invention;

FIG. 17 is an end elevational view, with some portions shown in cross-section, of the assembly of FIG. 16;

FIG. 18 is a top plan view of the connector in the assembly of FIGS. 16 and 17;

FIG. 19 is a bottom plan view thereof;

FIG. 20 is a cross-sectional view along line 20—20 of FIG. 18;

FIG. 21 is a cross-sectional view along line 21—21 of FIG. 19;

FIG. 22 is a cross-sectional view along line 22—22 of FIG. 19;

FIG. 23 is a perspective schematic view of a structural assembly using still another embodiment of a connector according to the present invention;

FIG. 24 is a detailed plan view of a portion of the assembly of FIG. 23;

FIG. 25 is a sectional view along line 25—25 of FIG. 24;

FIG. 26 is a bottom plan view of one of the connectors used in the assembly of FIGS. 23 and 24;

FIG. 27 is a cross-sectional view along line 27—27 of FIG. 26;

FIG. 28 is a cross-sectional view along line 28—28 of FIG. 26; and

FIG. 29 is a cross-sectional view along line 29—29 of FIG. 26.

Referring now to the drawings, and more particularly to FIGS. 1–3 therein, there is shown a structural assembly of two structural members designated respectively at 10 and 12. Both structural members 10 and 12 are represented as being tubular, square in cross-section, and provided on each side wall 14 thereof with regularly spaced circular apertures or perforations 16. The tubular members 10 and 12 are in the shape of the square tubular structural members well-known to those skilled in the art under the trademark "Telespar." It is evident that the apertures or perforations 16 could be other than circular and could be of any convenient shape whatsoever such as square, hexagonal or rectangular, and it is evident that the tubular members may be rectangular in cross-section or may consist of flat members provided with a row of longitudinally aligned regularly spaced perforations. Alternately, the structural members may also consist of U-shaped channel struts having a row of longitudinally aligned regular spaced apertures or perforations in the bottom wall thereof. As will become evident when the description of the present invention is read, the principles of the invention are also applicable to connectors as herein described and illustrated used in combination with such flat structural members or such U-shaped channel structural members.

Structural members 10 and 12 are interconnected by means of connector plate member 18 sandwiched between a sidewall 14 of structural member 10 and a sidewall 14 of structural member 12, and by means of bolt 20 of a diameter such as to be capable of passing through two aligned perforations 16 on two opposite sidewalls of structural member 12, through perforation 22, substantially at the center of connector plate 18 and through aligned perforations 16 on two opposite sidewalls of structural member 10. Bolt 20 has a threaded end portion 24 adapted to engage the threaded bore 26 of a nut 28 so that the two structural members 10 and 12 may be clamped together with connector plate member 18 sandwiched between two side walls thereof, as shown particularly in detail in FIG. 3. As shown more clearly in FIG. 3 and in FIGS. 4–6, connector plate member 18 is substantially square in shape and is provided with two pairs of projecting coined lug elements 30 and 32 arranged symmetrically relative to perforation 22 and disposed along an imaginary line connecting two opposite apices of the square plate member. The tool used for forming such projecting coined lug elements is adapted to leave on the other side of the plate member from which the coined lug elements project corresponding coined depressions shown at 34 and 36. Another pair of projecting coined lug elements 38 and 40, with their centers substantially aligned on an imaginary line passing through the center of perforation 22 and forming substantially a right angle with the imaginary line passing through the centers of coined depressions 34 and 36, are disposed so as to project from the other side of connector plate member 18, with corresponding depressions 42 and 44 being formed on the side on which are situated projecting coined lug elements 30 and 32. In this manner, one pair of projecting coined lug elements, for example, 38 and 40 is arranged to engage two perforations 16 disposed on either side of the perforation 16 through which passes bolt 20 in the assembly of FIGS. 1–3, and a pair of projecting coined lug elements 30 and 32 is arranged to engage two perforations 16 disposed on either side of the perforation 16 on the corresponding sidewall of structural member 12 through which also passes the fastening bolt 20. It can thus be seen that by means of a single bolt and nut assembly, the two structural members 10 and 12 are assembled side by side and in a substantially rigid manner with their longitudinal axes disposed in parallel planes, the projections of such axes being at right angles to each other, by means of the connector plate member of FIGS. 3–5, and that, in spite of any load being imposed on either end of structural member 12, for example, with structural member 10 being held solidly such as being a post rigidly planted into the ground, the two structural members are prevented from moving relatively to each other in view of the coined projecting elements engaging the perforations in the respective members.

FIGS. 7–9 represent a connector, different in outline from the connector in FIGS. 3–5 and 6, but otherwise alike with respect to its aperture or perforation 22 situated centrally thereto and surrounded by a pair of projecting coined lug elements 30 and 32 projecting from one face thereof and coined lug elements 38 and 48 projecting from the other face thereof, an imaginary line connecting coined lug elements 30 and 32 forming substantially a right angle with the imaginary line connecting the centers of coined lug elements 38 and 40. The connector plate member 18 of FIGS. 7–9 is used in the same manner as the connector plate member 18 of FIGS. 3–6, the only difference between the two being in their overall shape as seen in their respective plan views.

FIGS. 10 and 11 represent an assembly of two members 10 and 12 disposed at a right angle to each other and being interconnected by means of a connector plate member 46 engaging a sidewall 14 of each structural member, the sidewalls engaged by the connector member being substantially coplanar. As shown in detail in FIGS. 12–15, connector plate member 46 is generally resembling a flat L-shaped plate member provided with a first mounting aperture or perforation 48 arranged to afford passage to a mounting bolt and being provided with equidistant projecting coined lug elements 50 and 52 symmetrically disposed on two sides thereof and situated on an imaginary line substantially aligned along the center of an arm 54 of plate member 46. A second mounting aperture or perforation 56 is disposed in the second arm 58 of the plate member and has, equidistant on two sides thereof, symmetrically disposed coined lug elements 60 and 62 projecting from the same face of the plate member as coined lug elements 50 and 52. Coined lug elements 60 and 62 have their centers along an imaginary line substantially at right angles with the imaginary line joining the centers of coined lug elements 50 and 52. At the intersection of the imaginary lines is disposed another coined lug element 64 projecting from the same face as the coined lug elements 50, 52, 60 and 62.

In this manner, as shown in FIGS. 10–11, connector plate 46 is adapted for assembling two structural members such as 10 and 12, with their longitudinal center axes substantially coplanar and at right angles, each of the coined lug elements 52 and 50 being disposed in a corresponding aperture 16 in one sidewall 14 of structural element 12, for example, and each of the coined lug elements 60 and 62 being disposed in a perforation 16 in a coplanar sidewall 14 of the structural member 10, coined lug element 74 being engaged, in the example of assembly shown, also into a perforation 16 of structural member 12. The two structural members are assembled together and clamped together by way of the connector plate member 46 by way of fasteners consisting of bolts 20 and nuts 28 adapted to pass through aligned perforations 16 in one of the connected structural members, and through the corresponding aperture or perforations 48 or 56 in the connector plate member.

It can be seen that in view of the presence of coined lug elements projecting from one face of the connector plate member and engaging the appropriate perforations in the connected structural members by means of only one fastener with respect to each structural member, a rigid assembly of the two structural members is thus effected. It can also be seen that, if so desired, a second connector plate member may be disposed on the other side of the connected structural members with the same bolts 20 being adapted to pass through the mounting aperture or perforations in the second connector plate member 46, such second connector plate member being shown in phantom line in FIGS. 11 at 46', thus insuring more rigid and strong connection between the two structural elements 10 and 12, without sacrifice to lightness and simplicity, and still using the same number of fasteners.

FIGS. 16–17 show an assembly comprising two structural members 10 and 12, with their axes disposed in one plane substantially at right angles to each other, and forming generally a T-shaped assembly, structural members 10 and 12 being connected by way of a connector plate member 66. As shown more clearly in FIG. 17 and as shown in detail in FIGS. 18–22, connector plate member 66 consists of a flat plate having a first mounting aperture or perforation 68 adapted to accept the body of a mounting bolt 20 also passing through a perforation 16 in the sidewall 14 of, for example, structural member 12. Symmetrically disposed on both sides of mounting aperture or perforation 68 are projecting coined lug elements 70 and 72 with their centers aligned on an imaginary line passing through the center of aperture 68 and situated on two sides thereof at such distance as to normally engage two perforations 16 in a structural member adjoining the perforation through which passes the mounting bolt. Along an imaginary line passing through the center of mounting aperture 68 and disposed at a right angle to the imaginary line passing through the center thereof and the centers of projecting coined lug elements 70 and 72 is a second mounting aperture or perforation 74 provided with symmetrically disposed projecting coined lug elements 76 and 78 having their centers substantially aligned on said imaginary line and projecting on the same side of connector plate member 66 as coined lug elements 70 and 72.

In this manner, the two structural members 10 and 12 are connected together, as shown in FIGS. 16 and 17, by means of a first bolt 20 engaging the first mounting aperture or perforation 68 in the connector plate member and arranged to pass through a perforation 16 in a sidewall 14 of structural member 12, projecting coined lug elements 70 and 72 being arranged to engage perforations 16 disposed on either side of said perforation 16 through which passes the bolt. Structural member 12 is mounted in the same manner by way of a bolt passing 20 through aligned perforations 74 in the connector plate member and 16 in the sidewall 14 of the structural member 12, projecting coined lug 76 and 78 being disposed to engage two adjoining perforations 16 disposed in the same sidewall 14 of the structural member on both sides of perforation 16 through which passes mounting bolt 20. It is obvious that if a stronger assembly is required, a second connector plate member can be disposed on the outside of the opposite sidewall of structural members 10 and 12, as shown in phantom lines at 66' in FIG. 17.

The connector plate member 66 of FIGS. 18–22 is generally T-shaped, with unequal arms, and such connector can be modified as shown in FIGS. 23–29 by having its shorter column arm portion of a length substantially equal to the width of its longer arm portion so as to be substantially in the shape of a rectangular plate member 80, for the purpose hereinafter indicated.

In FIG. 23 is shown an example of a complex structural assembly using connector plate member 80 as connecting means in view of the limited space existing between the different elbow portions of the assembly. In the example of FIG. 23, a first structural member 10 is connected with a second structural member 12 having one end thereof abutting against a sidewall of structural member 10. A third structural member 11 is disposed with one end abutting against a sidewall of structural member 12 substantially close to the connection of structural members 10 and 12. A fourth structural member 13 is also disposed with one end abutting against a sidewall of structural member 11, all the structural members being shown with their axes substantially coplanar, although it is evident as will develop from the description herein in further detail, that the axes of the structural members may be disposed in several planes without departing from the principles of the invention. The structural members 10, 12, 11 and 13 are connected two by two by means of connector plate members shown at 80. As best shown in the detail assembly views of FIGS. 24 and 25 and in the views of the connector plate member 80 of FIGS. 26–29, each connector plate member 80 consists of a substantially rectangular plate having a first mounting aperture or perforation 82 provided with symmetrically disposed projecting coined lug elements 84 and 86 symmetrically disposed therewith at appropriate distances so that, when aperture or perforation 82 is engaged by the body of a mounting bolt 20, each coined lug element 84 or 86 adapted to engage a perforation 16, on a sidewall 14 of the structural member, disposed on either side of the perforation 16 through which passes the body of the mounting bolt. However, the area, as seen in plane projection, of coined lug 86 is at most only one half the area, as seen in plane projection, of a perforation 16 of a structural member. Plate 80 is provided with a second mounting aperture or perforation shown at 88 having equidistant projecting coined lug elements 90 and 92 disposed symmetrically thereto, with their centers substantially on an imaginary line forming a right angle with an imaginary line joining the centers of coined lug elements 84 and 86. Coined lug element 90, situated on the edge of the connnector plate 80 is also of an area which, when seen in projection, is at most one half the area of a perforation 16 in a sidewall 14 of a structural member.

Due to the presence of at most one half of coined lug elements such as 84, 86 and 90 at the edges of the connector plate 80, the same perforation 16 in the structural members in which is engaged either one of the coined lug elements 84, 86 or 90 is capable of accepting a similar half sized coined lug element so that several connector plate members 80 can be disposed in close proximity, as shown in FIGS. 23, 24 and 25. As shown in FIG. 25 at 80', the connector plate members may be disposed in pairs, each member being disposed on opposite sides of the connected structural members.

Although the structural connectors according to the principles of the invention have been shown in structural assemblies wherein structural members are disposed generally at right angles to each other, it is evident that the principles of the present invention are applicable to structural assemblies wherein the diverse elements are interconnected in parallel or at any angle other than 90 degrees. However, the invention has been described and illustrated with respect to such right angle interconnections, as would generally be the case in most practical structural assemblies, for illustrative purposes only.

Having thus described the invention, by way of several illustrative embodiments thereof, what is sought to be protected by United States Lettters Patent is:

1. In a structural assembly having first and second structural members each provided with regularly spaced longitudinally aligned perforations, connecting means clamping said structural members together in a right angle relationship comprising: a flat connector plate member; at least a first pair of integral coined lug elements projecting from said connector plate member with their centers on a line parallel to the longitudinal axis of said first structural member and each of which snugly engages one of said perforations in said first structural member; at least a second pair of integral coined lug elements projecting from said connector plate member with their centers on a line substantially normal to the line of centers of said first pair of lug elements so that with said second structural element disposed normally with respect to said first structural member each of said second pair of lug elements snugly engages one of said perforations in said second structural member; a perforation at mid-distance between the coined lug elements of a pair registering with one of said perforations in one of said structural members; and a bolt engaged in said perforation in the connector member and in each of the registered perforations in the structural members and cooperating with a nut securing said plate and said members together.

2. The connecting means of claim 1 wherein said first pair of coined lug elements is disposed on one side of said connector plate member, said second pair is disposed on the other side thereof and said connector plate member is sandwiched between said first and second structural members.

3. The connecting means of claim 1 wherein said first and second pairs of coined lug elements are disposed on one side of said connector plate member and at least one of said connector plate members is placed on one side of each of said first and second structural members with said coined lug elements projecting in said perforations therein, said side of said first structural member being substantially coplanar with said side of said second structural member.

4. The connecting means of claim 1 wherein said first and second pairs of coined lug elements have a common lug disposed at the intersection of said lines of centers.

5. The connecting means of claim 4 wherein said connector plate member is substantially L-shaped.

6. The connnecting means of claim 1 wherein said perforation is disposed at the intersection of said lines of centers.

7. The connecting means of claim 6 wherein said connector plate member is substantially T-shaped.

8. The connecting means of claim 7 wherein at least one coined lug element is situated on the peripheral edge of said connector plate member and said coined lug element has an area which is at most one half the area of the corresponding perforation in one of said structural members.

9. In a structural assembly having a first and a second structural member each provided with regularly spaced longitudinally aligned performations, connecting means clamping said structural members together in a right angle relationship comprising: a substantially flat connector plate member; a first group of projecting coined lug elements on one side of said connector plate member each of which engages one of said perforations in said first structural member; a second group of projecting coined lug elements on the side of said connector plate member opposite said first group and each of which engages one of said perforations in said second structural member, said connector plate member being sandwiched between said first and second structural members and said first and second structural members being disposed in a right angle relationship; at least one perforation in said connector plate disposed at mid-distance between consecutive projecting coined lug elements in a group and registering with a perforation in said first and second structural members; and fastening means extending through said perforations attaching said structural members and said connector plate member together.

10. In a structural assembly having a first and a second structural member each provided with regularly spaced longitudinally aligned perforations, connecting means clamping said structural members together in a right angle, abutting relationship comprising: a substantially flat connector plate member; a first pair of projecting coined lug elements on said connector plate member each of which engages one of said perforations in said first structural member; a second pair of projecting coined lug elements on said connector plate member each of which engages one of said perforations in said second structural member; said first and second pairs of projecting coined lug elements being disposed on the same side of said connector plate member; a perforation disposed in said connector plate member intermediate each of said pairs of said projecting coined lug elements and fastening means extending through said perforations and corresponding perforations in said first and second structural members attaching said connector plate member and said structural members together.

11. The connecting means of claim 10 wherein said first and second groups of projecting coined lug elements are longitudinally aligned along imaginary lines intersecting substantially at right angles to each other.

12. The connecting means of claim 11 wherein said first and second groups of projecting coined lug elements have a common lug element disposed at the intersection of said imaginary lines.

13. The connecting means of claim 12 wherein said connector plate member is substantially L-shaped.

14. The connecting means of claim 11 wherein a perforation is disposed at the intersection of said imaginary lines.

15. The connecting means of claim 14 wherein said connector plate member is substantially T-shaped.

16. The connecting means of claim 15 wherein at least one projecting coined lug element is situated on the peripheral edge of said connector plate member and said projecting coined lug element has an area which is at most one half the area of the corresponding perforation in one of said structural members.

References Cited

UNITED STATES PATENTS

| | | | |
|---|---|---|---|
| 1,896,530 | 2/1933 | Trout | 287—189.36 |
| 2,972,386 | 2/1961 | Tanke | 287—189.36 |
| 2,983,071 | 5/1961 | Oliver | 287—189.36 |

FOREIGN PATENTS 664,555   6/1963   Canada.

CARL W. TOMLIN, *Primary Examiner.*

R. S. BRITTS, *Assistant Examiner.*

U.S. Cl. X.R.

287—54